(12) United States Patent
Lee

(10) Patent No.: US 12,061,679 B2
(45) Date of Patent: Aug. 13, 2024

(54) SMART LOTO METHOD AND SYSTEM

(71) Applicant: Lihong Safety Equipment Engineering (Shanghai) Co., Ltd., Shanghai (CN)

(72) Inventor: Anson Lap Yin Lee, Shanghai (CN)

(73) Assignee: Lihong Safety Equipment Engineering (Shanghai) Co., Ltd., Shanghai (CN)

( * ) Notice: Subject to any disclaimer, the term of this patent is extended or adjusted under 35 U.S.C. 154(b) by 194 days.

(21) Appl. No.: 17/679,107

(22) Filed: Feb. 24, 2022

(65) Prior Publication Data

US 2022/0269758 A1  Aug. 25, 2022

(30) Foreign Application Priority Data

Feb. 25, 2021 (CN) .......................... 202110212078.X

(51) Int. Cl.
*G06F 21/31* (2013.01)
(52) U.S. Cl.
CPC ................................. *G06F 21/31* (2013.01)
(58) Field of Classification Search
CPC .. G06F 21/31; G07C 9/00309; G07C 9/00571
See application file for complete search history.

(56) References Cited

U.S. PATENT DOCUMENTS

| 9,881,749 | B1 | 1/2018 | Griffin | |
|---|---|---|---|---|
| 2013/0214903 | A1* | 8/2013 | Kalous | E05B 65/48 340/5.61 |
| 2014/0283008 | A1* | 9/2014 | Daino | G06F 21/44 726/17 |

(Continued)

FOREIGN PATENT DOCUMENTS

| CN | 102736548 A | 10/2012 |
|---|---|---|
| CN | 103195303 A | 7/2013 |
| CN | 106611452 A | 5/2017 |

(Continued)

OTHER PUBLICATIONS

Search Report, issued in CN202110212078.X (priority application), by CNIPA, dated Jun. 2, 2022.
Search Report, issued in CN202110212078.X (priority application), by CNIPA, dated Mar. 23, 2023.
Notice of First Office Action, issued in CN202110212078.X (priority application), by CNIPA, dated Jun. 23, 2022.

(Continued)

*Primary Examiner* — El Hadji M Sall
(74) *Attorney, Agent, or Firm* — Zhu Lehnhoff LLP

(57) ABSTRACT

This invention of Smart LOTO solves frequent safety violation of "Lock Out Tag Out" practice. While the violations often caused by poor human behavior of forgetting or ignoring the LOTO practice during maintenance, the Smart LOTO equipped with the following method and system to eliminate the human error: S1: Smart LOTO monitors the off signal from the energy source switch; S2: when Smart LOTO confirmed the energy source switch is in off position, the biometric data such as fingerprint or face recognition will be compared between the personnel who triggered and the data in the system, once authenticated, the self-locking mechanism will be activated to lock up the switch. S3: Smart LOTO will then upload Information such as Who, When, where, How Long wirelessly to the cloud platform for analysis purpose. This invention can enhance the overall safety aspect of the LOTO practice.

18 Claims, 8 Drawing Sheets

(56) References Cited

U.S. PATENT DOCUMENTS

2014/0367232 A1    12/2014   Wan
2017/0113856 A1    4/2017   Hollis et al.

FOREIGN PATENT DOCUMENTS

| CN | 108492410 | A | 9/2018 |
| CN | 109087428 | A | 12/2018 |
| CN | 109147095 | A | 1/2019 |
| CN | 111927222 | A | 11/2020 |
| DE | 29515997 | U1 | 5/1996 |
| JP | 2007146369 | A | 6/2007 |
| WO | 2019232550 | A1 | 12/2019 |

OTHER PUBLICATIONS

Notice of Second Office Action, issued in CN202110212078.X (priority application), by CNIPA, dated Dec. 12, 2022.
Notification of registration, issued in CN202110212078.X (priority application), by CNIPA, dated Mar. 29, 2023.
"Optimization and control of high voltage switch in underground substation", written by Shuai LV, dated May 31, 2018.
Applicant Submissions, issued in CN20211021078.X (priority application), dated Mar. 23, 2023.
Applicant Submissions, issued in CN202110212078.X (priority application), dated Nov. 7, 2022.
Applicant Submissions, issued in CN202110212078.X (priority application), dated Mar. 6, 2023.

* cited by examiner

SMART LOTO METHOD AND SYSTEM

The present application claims the priority of the Chinese Patent Application No. 202110212078.X, filed Feb. 25, 2021, entitled "SMART LOTO METHOD AND SYSTEM", which is incorporated herein by reference in its entirety.

BACKGROUND OF THE INVENTION

Field of the Invention

The invention belongs to the technical field of equipment safety, in particular to A Smart LOTO method and system.

Description of the Prior Art

Locked up for LOTO, hereinafter short for LOTO, device had been important aspect in respect to machinery safety standards, most of the world's manufacturing enterprises will require maintenance personnel abide by this locked up procedure for the operation, to avoid the equipment safety accidents during the process of maintenance, to ensure the personnel safety in the process of maintenance equipment. Among them, with the latest development of Industrial Revolution, the equipment is gradually towards the development of automation and intelligence, no longer fully rely on people to operate. However, reluctance of LOTO practice continue to cause the frequent occurrence of safety accidents despite of the automated working environment. Therefore, an effective monitoring and management of LOTO system and method should be invented to improve the safety issue.

The existing implementation method of LOTO generally adopts a simple mechanical locks and hand written tag to carry out the related operations of locking and listing on the energy source switch of the equipment. Among them, the locking and listing method of mechanical lock is very unreliable to operate due to the nature of behavior where the lock and key are easy to be lost or forgotten, leading to the individual personnel behavior. Personnel often forget to lock up, deliberately not locked up and locked up for random irregularities, these are the main causes of safety accident. Despite of the safety regulation and standard, this practice totally rely on personnel behavior, this leads to violation of compliance standard and regulation.

SUMMARY OF THE INVENTION

The invention provides A smart LOTO method and system to solve the technical problems of locking out and tagging out the energy source switches.

The technical scheme of the invention is as follows:

A smart LOTO method is applied to system, wherein the system includes a cloud platform and several devices. The method includes the following steps:

S1: Multiple Smart automatic locking functions respond to the closing signal of their respective energy source switches and issue locking reminders respectively.

S2: Each Smart LOTO collects identity information and uploads it to the cloud platform for authentication or local authentication.

Uploaded to the cloud platform to verify further includes: the cloud platform according to the preset locked up for linkage and grouped to verify the identity information of receiving information, the same set of validation are through to the group after each corresponding Smart LOTO automatically locked up for sending locked up for instructions, among them, locked up for linkage between information including Smart LOTO automatically locked up for networking relations;

To local identity authentication further comprising: Smart LOTO automatically locked up for local verify their acquisition of identity information, and feedback to the cloud platform authentication information, the cloud platform authentication information group, according to the locked up for linkage information authentication information in the same group were by corresponding to the group after the Smart LOTO automatically locked up;

S3: Each Smart LOTO receives the locking and listing instruction, automatically locks the respective energy source switch, and prompts the locking and listing status.

According to an embodiment of the invention, in step S2,

The cloud platform verifies whether the identity information has the operation permission of the corresponding Smart LOTO by querying the right management information of the cloud platform. If it has the operation permission, the lock verification succeeds; otherwise, the lock verification fails.

The Smart LOTO delivers the configured authorization management information through the cloud platform to verify whether the identity information has the operation permission of the corresponding Smart LOTO. If it has the operation permission, the lock authentication succeeds; otherwise, the lock authentication fails.

According to an embodiment of the invention, in step S2, the identity information is fingerprint information or facial information.

According to an embodiment of the invention, after step S3, it also includes:

S4: Each Smart LOTO collects the identity information again and uploads it to the cloud platform for verification or performs local verification on the identity information.

Uploading to the cloud platform for re-verification further includes: the cloud platform receives and verifies each identity information according to the locking and listing linkage information and sends unlock instructions to each Smart LOTO corresponding to the same group after passing the authentication;

Validation of identity information to the local further include: Smart automatic locking Smart LOTO listed to verify their acquisition of local identity information, and feedback to the cloud platform authentication information, the cloud platform authentication information group, according to the locked up for linkage information authentication information in the same group were by corresponding to the group after the Smart LOTO sends the unlock instructions;

S5: Each Smart LOTO receives the unlocking instruction, automatically unlocks the respective energy source switch, and prompts the unlocking status.

According to an embodiment of the present invention, in Step S4,

The cloud platform by querying the cloud platform is the authorized management information verified identity information listed has a Smart LOTO operation permissions, and verify the same for Smart LOTOs lock and unlock the identity information is consistent;

Smart LOTO through the cloud platform distributed configuration is the authorized management information listed has a corresponding Smart LOTO operation permissions, and verify the same for Smart LOTOs lock and unlock the identity information is consistent, if have operation permissions and locked to unlock the unlock will be inconsistent authentication information through, unlock conversely validation fails.

According to an embodiment of the invention, step S1 also includes:

S01: Send a locking and listing linkage request to the cloud platform, wherein, the locking and listing linkage request includes the identification codes of multiple Smart LOTOs that need to lock and listing linkage;

S02: The cloud platform establishes the locking and listing linkage information according to the locking and listing request.

A linkage Smart automatic lock and listing system comprises a cloud platform and several Smart automatic lock and listing Smart LOTOs, wherein a lock verification module is provided on the cloud platform;

The Smart LOTO is used to respond to the closing signal of the respective energy source switch, issue locking reminder respectively, collect identity information, upload it to the cloud platform or perform local verification on the identity information, and feedback verification information to the cloud platform;

The locking authentication module is used to receive and group each identity information according to the preset locking and listing linkage information. After passing the same group of authentication, it sends the locking and listing instruction to each Smart LOTO corresponding to the group, or it is used to group the authentication information according to the locking and listing linkage information. After the authentication information of the same group passes, the locking and listing instruction is sent to each Smart LOTO corresponding to the group. Among them, the locking and listing linkage information includes the networking relationship between Smart LOTOs.

The Smart LOTO is also used to automatically lock the respective energy source switches after receiving the locking and listing instructions and prompt the locking and listing status.

According to one embodiment of the invention, the cloud platform is also provided with an unlock verification module;

The Smart LOTO is also used to collect identity information again, upload it to the cloud platform or verify the identity information locally, and feedback the verification information to the cloud platform.

The unlock authentication module is used to receive and group each identity information again according to the locking and listing linkage information. After passing the same group of authentication, it sends the unlock instruction to each Smart LOTO corresponding to the group, or it is used to group the authentication information according to the locking and listing linkage information. After passing the authentication information of the same group, unlock instructions are sent to each Smart LOTO corresponding to the group.

The Smart LOTO is also used to automatically unlock the respective energy source switches after receiving the unlocking instruction and prompt the unlocking status.

According to the present invention unlock modules used by querying the cloud platform is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, Otherwise, the unlock verification fails.

Or for Smart LOTOs used in distributed through the cloud platform configuration is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, Otherwise, the authentication fails.

According to the first embodiment of the invention, the cloud platform is also provided with a networking module for receiving the locking and listing linkage request, and establishing the locking and listing linkage information according to the locking and listing linkage request, wherein the locking and listing linkage request includes the identification codes of multiple Smart LOTOs that need to lock and listing linkage.

According to the value transfer system of the above embodiments, the present application has the following beneficial effects:

1) the invention through Smart LOTO and cloud platform, the cloud platform not only can be unified to multiple Smart LOTOs verified identity information and locked up for process monitoring, and multiple Smart LOTOs can be through the same cloud platform, can achieve any networking between Smart LOTOs, so as to realize multiple locked up for locked up for linkage Smart LOTO type, namely linkage lock and unlock, Meet the locking and listing requirements of any Smart LOTO group, greatly improve the application range of the Smart LOTO, and the security of the linkage locking and listing is more secure;

2) the invention when locked up, need to enter the identity information verification, validation is locked up for rights, have permissions to perform locked up for operation, when the unlock, also need to enter the identity information for validation, not only to investigate whether has locked up for permissions, more to verify and locked up the identity of the input information is the same, Have permission to lock and unlock the same information to perform the unlock operation, which in the process of linkage lock unlock, avoid the Smart LOTO automatically locked up for a separate unlocked and the danger, limit the lock and unlock must be the same person or same people, greatly improving the safety of operators and use more convenient and efficient, safe.

BRIEF DESCRIPTION OF THE DRAWINGS

By reading the detailed description of preferred practices below, a variety of additional advantages and benefits will become clear to the average technician in the field. The appended drawings are used only for the purpose of showing preferred embodiments and are not considered to be a limitation of the invention.

ILLUSTRATION OF THE DRAWINGS

Figure 1:
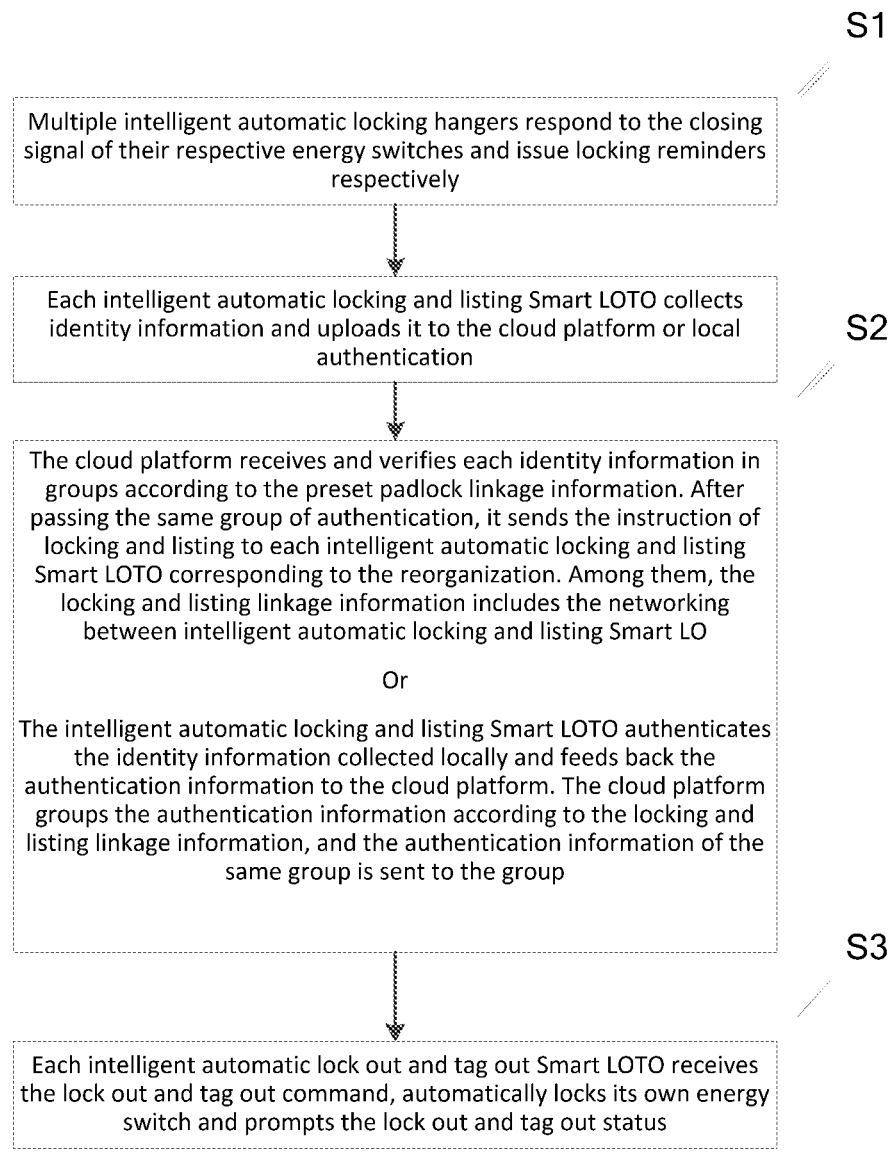
FIG. 1 is the lock listing flow chart of the linkage method of the invention.

1—Control circuit; 2—Energy source switch; 3—Identity identification module; Servo motor; 421—the push rod; 422—Drive rod; 423—pin; 43—Position sensor; 5—Alarm module.

DESCRIPTION OF THE PREFERRED EMBODIMENTS

In order to more clearly describe the embodiments of the invention or the technical scheme in the prior art, the specific embodiments of the invention are described below in reference to the attached drawings. It is obvious that the appended drawings described below are only some embodiments of the invention. For ordinary technicians in the field, other appended drawings and other embodiments can be obtained on the basis of these drawings without creative effort.

In order to keep the drawings simple, only the parts related to the invention are schematically shown in each drawing and they do not represent the actual structure of the product. In addition, in order to make the drawing simple and easy to understand, in some drawings only one of the parts with the same structure or function is schematically drawn, or only one of them is marked. In this context, "one" means not only "only one", but also "more than one".

As shown in FIG. 1, this application provides a linkage Smart LOTO method, which is applied to system. includes cloud platform and several smart automatic lock and listing Smart LOTOs. The method includes the following steps:

S1: Multiple Smart automatic locking hangers respond to the closing signal of their respective energy source switches and issue locking reminders respectively.

S2: Each Smart LOTO collects identity information and uploads it to the cloud platform for authentication or local authentication. Among them, Uploaded to the cloud platform to verify further includes: the cloud platform according to the preset locked up for linkage and grouped to verify the identity information of receiving information, the same set of validation are through to the group after each corresponding Smart LOTO automatically locked up for sending locked up for instructions, among them, locked up for linkage between information including Smart LOTO automatically locked up for networking relations;

To local identity authentication further comprising: Smart LOTO automatically locked up for local verify their acquisition of identity information, and feedback to the cloud platform authentication information, the cloud platform authentication information group, according to the locked up for linkage information authentication information in the same group were by corresponding to the group after the Smart LOTO automatically locked up for sending locked up for instruction;

S3: Each Smart LOTO receives the locking and listing instruction, automatically locks the respective energy source switch, and prompts the locking and listing status.

The present embodiment is described in detail, but not limited to this.

The smart LOTO method in this embodiment is suitable for locking and listing of various electrical equipment.

Further, the implementation of the case is more suitable for need linkage locked up for electrical equipment group, relate to each other, each Smart LOTO in the electrical equipment group need to be locked up for need to the multiple Smart LOTOs at the same time, through this example easily implement multiple Smart LOTOs locked up for interconnected, use convenient and efficient, better security.

1) Introduce Step S1 in Detail

In this embodiment, multiple Smart automatic locking hangers respond to the closing signals of their respective energy source switches and issue locking reminders respectively.

Figure 5:
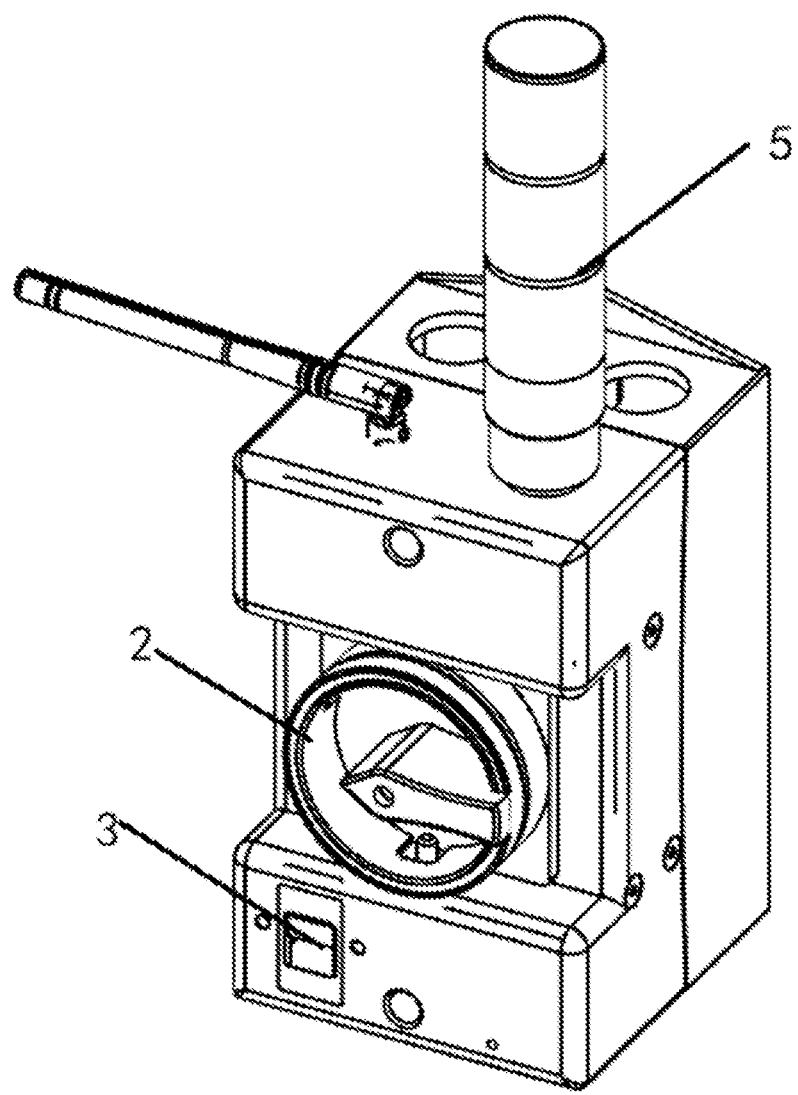
FIG. 5 is the overall structure diagram of the Smart LOTO of the invention.
Figure 6:
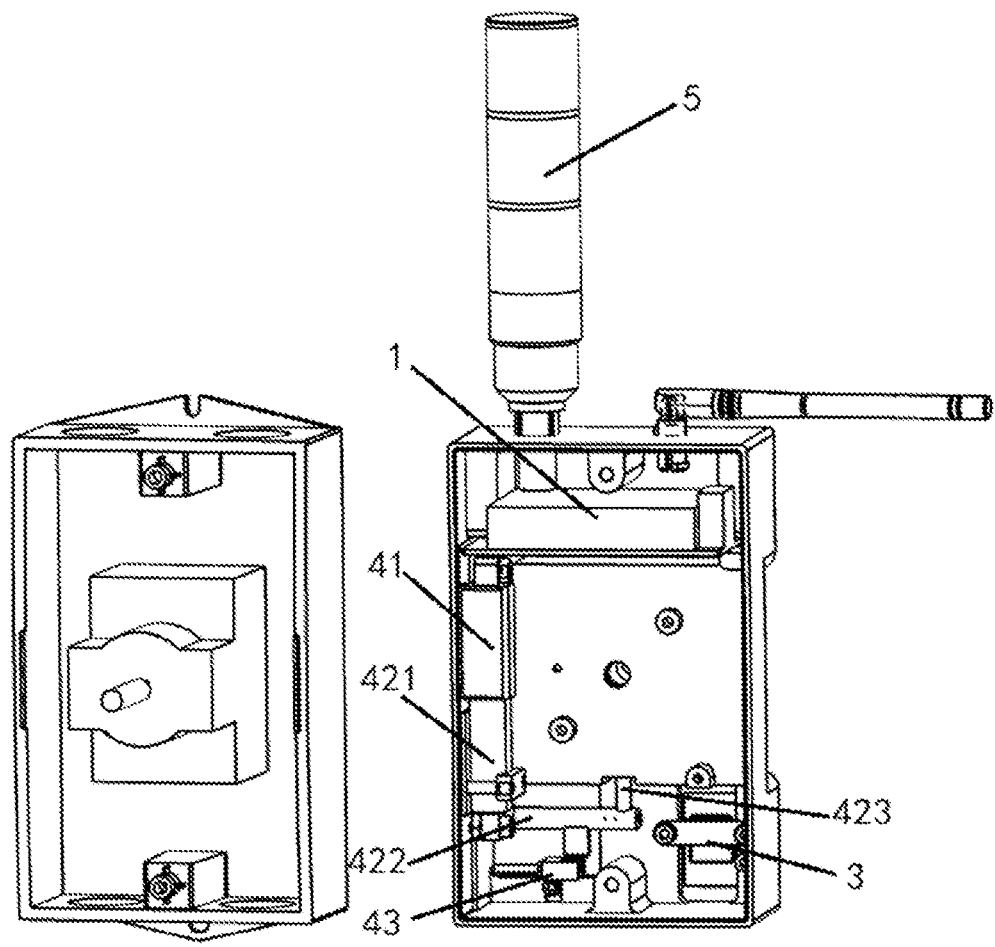
FIG. 6 is the internal structure diagram of the Smart LOTO of the invention.
Figure 7:
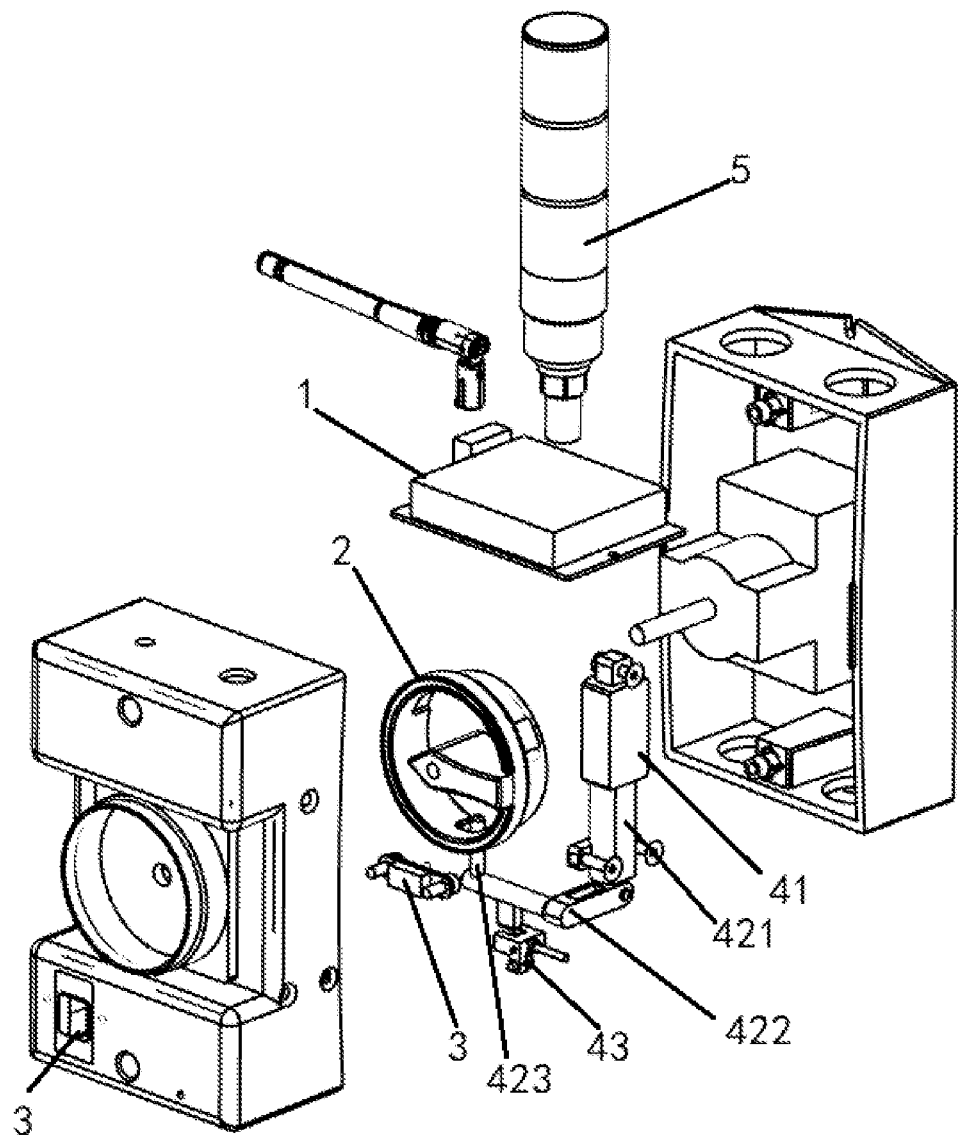
FIG. 7 is the explosive structure diagram of the Smart LOTO of the invention.

Specifically, see FIGS. 5 to 7, the implementation example of Smart LOTO includes: 1, energy control circuit switch 2, identification module 3, automatically locked module, alarm module 5, 1 respectively with energy source switch 2 control circuit, identification module 3, automatically locked module, alarm module 5 signal connection. Among them, the response to energy source switch 2, the closure of the signal control circuit control alarm module 1 5 locked remind, among them, the power switch 2 can produce closed when closing by means of electromagnetic induction signal, can also be produced when closing by means of electrical contact closed signal, to achieve the purpose of switch state in the process of locked up for testing.

2) Introduce Step S2 in Detail

In this embodiment, each Smart LOTO collects identity information and uploads it to the cloud platform or performs local authentication on the identity information. Specifically, see FIGS. 5 to 7. In response to the identity information collected by identity module 3, control circuit 1 is used to upload the identity information to the external platform for authentication or perform local authentication on the identity information.

See FIG. 7, the implementation of the case identification module 3 sensors, including fingerprint identification module and fingers finger sensors used in sensor can work input and awakens the fingerprint identification module, fingerprint identification module is used for collecting locked up for operators of fingerprint information, control circuit is used to 1 fingerprint information uploaded to the external platform authentication. Finger sensors can use infrared sensor, fingerprint identification module has the characteristics of small amount of data, transmission is fast, in this example with narrowband Internet of NB-IOT communication mode, the identity of the efficient information communication, can satisfy multiple Smart LOTO locked up for validation of communication requirements at the same time, And will not cause obvious communication delay, the overall operation is not affected. In addition to the fingerprint identification module, the identity identification module 3 of this embodiment can also use face recognition and identity password input modules to realize the input of identity information, and 5G communication module can also be used to realize more efficient and fast communication between the Smart LOTO and the platform.

In this example of a way of implementation, the implementation example of the cloud platform according to the preset locked up for linkage and grouped to verify the identity information of receiving information, the same set of validation are through to the group after each corresponding Smart LOTO automatically locked up for sending locked up for instructions, among them, locked up for linkage between information including Smart LOTO automatically locked up for networking.

In this example, in another way of implementing a Smart LOTO automatically locked up for local verify their acquisition of identity information, and feedback to the cloud platform authentication information, the cloud platform authentication information group, according to the locked up for linkage information authentication information in the same group were by corresponding to the group after the Smart LOTO automatically locked up for sending locked up for instructions.

The locking and listing linkage information in this embodiment is used for the cloud platform to manage the networking between Smart LOTOs. The cloud platform can obtain specific interconnected Smart LOTOs corresponding to specific locking and listing operations by querying the networking relationship. The cloud platform can also directly change/add/delete specific Smart automatic lock and listing Smart LOTOs associated with specific lock and listing operations by configuring the networking relationship. It does not need to configure each Smart automatic lock and listing Smart LOTO. In this way, the operation is simple, the networking speed is fast, and the work efficiency is high.

Specifically, before Step S1, it also includes: S01: send the locking and listing linkage request to the cloud platform, wherein, the locking and listing linkage request includes the identification codes of multiple Smart LOTOs that need to lock and listing linkage; S02: The cloud platform establishes or configures the locking and listing linkage information according to the locking and listing request. Among them, the locking and listing linkage request can be any terminal Smart LOTO connected to the cloud platform, such as mobile phone, tablet, PC, etc. Through the locking and listing linkage request, the locking and listing linkage information on the cloud platform can be established or the configuration can be modified. Preferably, permission information is also included in the locking and listing linkage request, and the cloud platform verifies this permission information before performing the corresponding operation of the request.

Specifically, in step S2, the cloud platform verifies whether the identity information has the operation permission of the corresponding Smart LOTO by querying the right management information of the cloud platform. If it has the operation permission, the lock verification succeeds; otherwise, the lock verification fails. The Smart LOTO delivers the configured authorization management information through the cloud platform to verify whether the identity information has the operation permission of the corresponding Smart LOTO. If it has the operation permission, the lock authentication succeeds; otherwise, the lock authentication fails. The authorization management information in this example includes at least the identity information with operation permission corresponding to the specific Smart automatic locking Smart LOTO.

3) Introduce Step S3

Each Smart LOTO in this embodiment receives the locking and listing instruction, automatically locks the respective energy source switch, and prompts the locking and listing status. Specifically, see FIGS. 5 to 7. In response to the locking and listing instruction obtained after the identity information verification, the control circuit 1 controls the automatic locking module to lock the energy source switch 2 and controls the alarm module 5 to prompt the locking and listing status.

See FIG. 6 and FIG. 7, the implementation of case automatically locked module adopts servo motor 41, lock rod, among them, the implementation of energy source switch 2 sets groove, servo motor and drive control lock rod inserted or exit hole groove, in order to realize the energy source switch 2 lock and unlock, lock rod including putting 421, 423, 422, transmission rod bolt One end of the push rod 421 is connected with the servo motor 41, and the other end of the push rod 421 is connected with the latch 423 by the transmission rod 422. The transmission rod 422 can be driven by pushing, rotating, lever and other ways to make the latch 423 move along the direction of the hole slot. In addition to the bolt hole 423 locked mode, automatic locking module can also be energy source switch 2 and equipment lock the connection relations between the design variable type for activities, need to be locked automatically when the lock switch module will lock and energy separation between 2, namely energy source switch disconnect between 2 and lock core, this energy source switch 2 can't change the state of the lock, When unlocking is required, the automatic locking module meshing the lock core with the energy source switch 2, that is, the energy source switch 2 rotates synchronously with the lock core, so that the energy source switch 2 can change the state of the lock core. Similarly, the automatic locking module can also use other structures, such as the lock type. When locking, it is automatically locked mechanically with rotation, and when unlocking, it is unlocked electronically, which will not be described here.

Preferably, as shown in FIG. 6 and FIG. 7, the automatic locking module in this embodiment is also provided with a position sensor 43, which is arranged below the locking connecting rod to detect the locking and unlocking states of the locking connecting rod, and to protect the servo motor 41 and locking connecting rod from being damaged by the excessive movement of the locking connecting rod. In this example, the position sensor 43 is set in the automatic locking module, which can not only provide state monitoring feedback, but also limit protection for the automatic locking module, reduce mechanical damage and prolong service life.

In this example through Smart LOTO and cloud platform, the cloud platform not only can be unified to multiple Smart LOTOs verified identity information and locked up for process monitoring, and multiple Smart LOTOs can be through the same cloud platform, can realize any networking between Smart LOTOs, so as to realize multiple Smart LOTO lock up, lock up Smart LOTO that linkage lock and unlock, Meet the locking and listing requirements of any Smart LOTO group, greatly improve the application range of the Smart LOTO, and the security of the linkage locking and listing is more secure.

Figure 2:
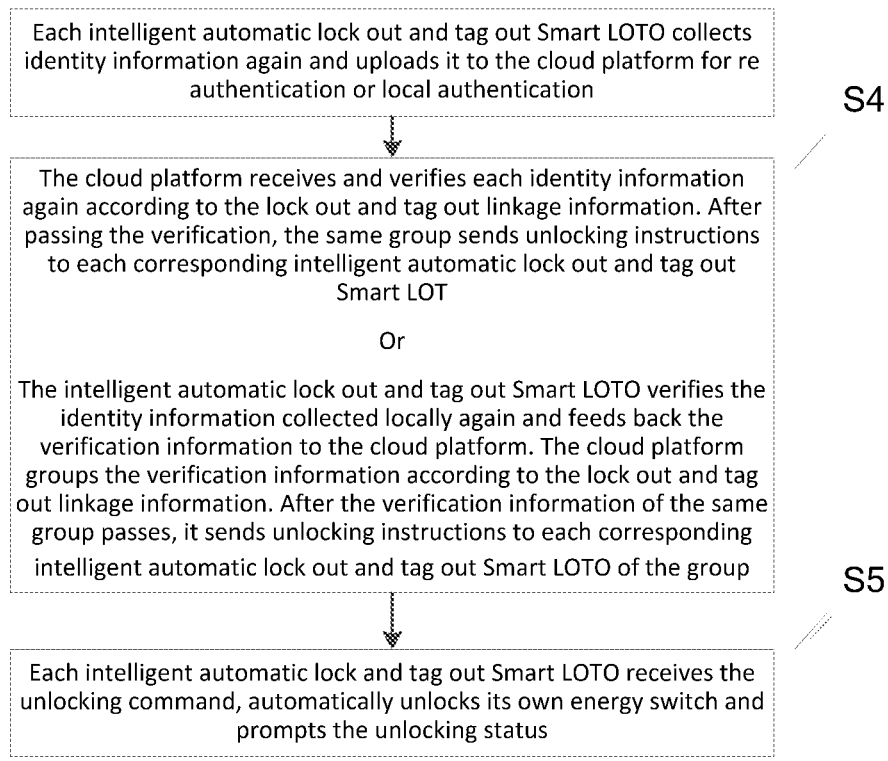
FIG. 2 is the unlocking flow chart of the linkage method of the invention.

It is best to refer to FIG. 2, after which step S3 includes:

S4: Each Smart LOTO collects identity information again and uploads it to the cloud platform for verification again or local verification for identity information again. If you want to unlock the Smart LOTO that has been locked, you need to collect and input identity information through the identity identification module again. The control circuit will upload the corresponding identity information to the cloud platform or verify the identity information locally again for unlocking verification;

In one embodiment of this example, the cloud platform receives and verifies each identity information again according to the locking and listing linkage information and sends unlock instructions to each Smart LOTO corresponding to the same group after passing the authentication. The cloud platform by querying the cloud platform is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, unlock conversely verify failure;

In this example, in another way of implementing Smart automatic locking Smart LOTO listed again to verify their acquisition of local identity information, and feedback to the cloud platform authentication information, the cloud platform according to locked up for linkage information to verify the information packet, validation of the same set of information through the corresponding to the group after each Smart LOTO sends the unlock instructions, among them, Smart LOTO through the cloud platform distributed configuration is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, unlock conversely validation fails.

S6: various Smart LOTO receives the unlock instructions, to perform automatic unlock their energy source switch, and prompt unlocked, among them, the Smart LOTO of control circuit to receive the unlock instructions, the control automatically locked module to perform automatic unlock their energy source switch, alarm and control module hint unlocked.

Listed on locked in this example, the need to enter identity verification, validation is locked up for rights, have permissions to perform locked up for operation, when the unlock, also need to enter the identity verification, not only to investigate whether has locked up for permissions, more to verify and locked up the identity of the input information is the same, Have permission to lock and unlock the same information to perform the unlock operation, which in the process of linkage lock unlock, avoid the Smart LOTO automatically locked up for a separate unlocked and the danger, limit the lock and unlock must be the same person or same people, greatly improving the safety of operators and use more convenient and efficient, safe.

See FIG. 5, the locked up by the alarm module process in the state of the instructions, specific alarm module 5 can be used in a sound and/or light alarm, and light alarm can use red, yellow, green, optimization, red can represent locked up for an illegal operation or remind locked up, yellow can represent is under a state of locked up, That is, the automatic locking module is locked to energy source switch 2. Green indicates that energy source switch 2 is normally on. In addition, alarm module 5 with other indicating modes can also be used, which will not be described here.

This application also provides a linkage Smart automatic lock and listing system based on the above embodiments, including: cloud platform and several Smart automatic lock and listing Smart LOTOs, among which, the cloud platform is equipped with lock verification module;

The Smart LOTO is used to respond to the closing signal of the respective energy source switch, issue locking reminder respectively, collect identity information, upload it to the cloud platform or perform local verification on the identity information, and feedback verification information to the cloud platform; The locking authentication module is used to receive and group each identity information according to the preset locking and listing linkage information. After passing the same group of authentication, it sends the locking and listing instruction to each Smart LOTO corresponding to the group, or it is used to group the authentication information according to the locking and listing linkage information. After the authentication information of the same group passes, the locking and listing instruction is sent to each Smart LOTO corresponding to the group. Among them, the locking and listing linkage information includes the networking relationship between Smart LOTOs. The Smart LOTO is also used to automatically lock the respective energy source switches after receiving the locking and listing instructions and prompt the locking and listing status.

The cloud platform of this embodiment also has an unlock verification module; The Smart LOTO is also used to collect identity information again, upload it to the cloud platform or verify the identity information locally, and feedback the verification information to the cloud platform. The unlock authentication module is used to receive and group each identity information again according to the locking and listing linkage information. After passing the same group of authentication, it sends the unlock instruction to each Smart LOTO corresponding to the group, or it is used to group the authentication information according to the locking and listing linkage information. After passing the authentication information of the same group, unlock instructions are sent to each Smart LOTO corresponding to the group. The Smart LOTO is also used to automatically unlock the respective energy source switches after receiving the unlocking instruction and prompt the unlocking status.

Further, in this example the unlock authentication module for by querying the cloud platform is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, Otherwise, the unlock verification fails. In this example of Smart automatic locking detailed listed Smart LOTOs used in distributed through the cloud platform configuration is the authorized management information verified identity information listed has a corresponding Smart automatic locking Smart LOTO operation permissions, and verify the same for Smart LOTOs lock and unlock the identity information is consistent, if have operation permissions and locked to unlock the unlock will be inconsistent authentication information through, Otherwise, the authentication fails.

The cloud platform of this embodiment also has a networking module, which is used to receive the locking and listing linkage request and establish the locking and listing linkage information according to the locking and listing linkage request. The locking and listing linkage request includes the identification codes of multiple Smart LOTOs that need to lock and listing linkage.

This example is introduced in combination with the linkage locking and listing process of the system.

Figure 3:
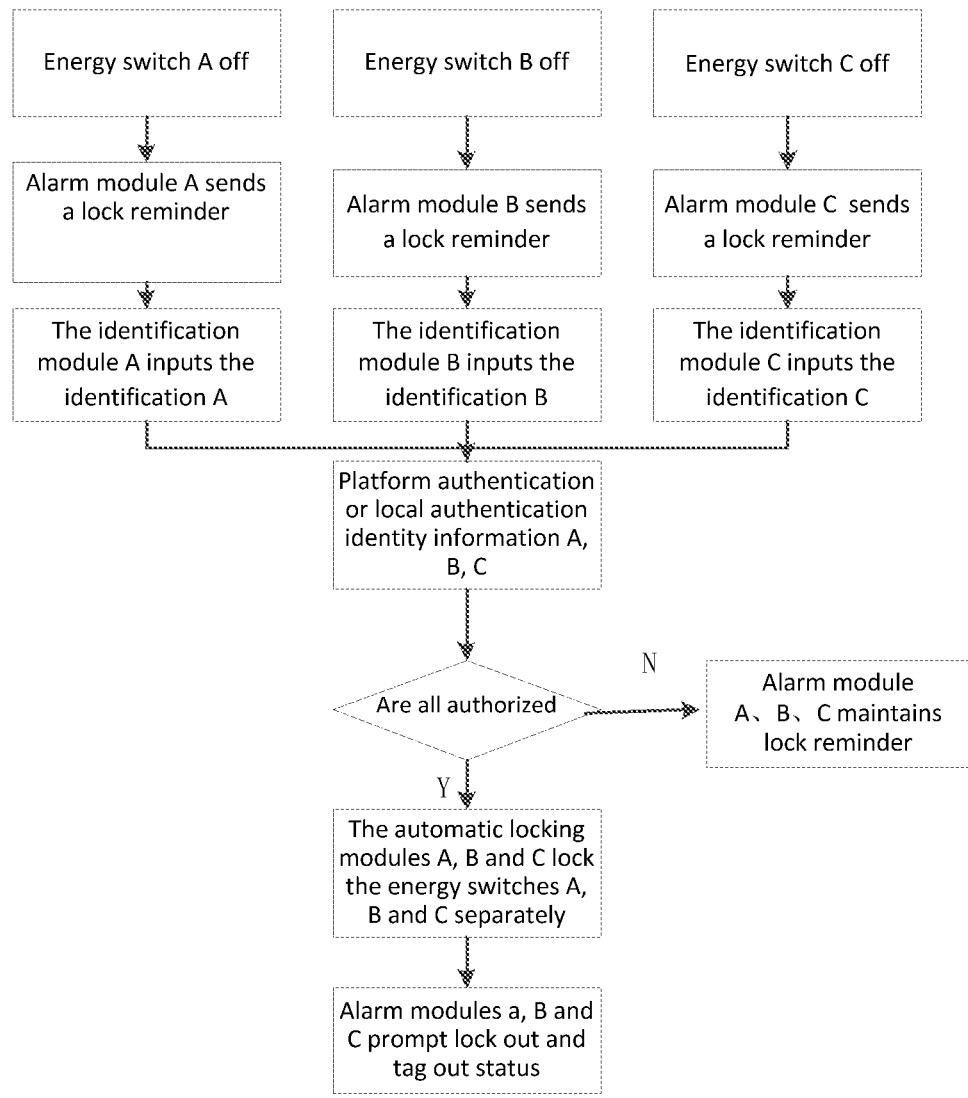
FIG. 3 is the lock listing flow chart of the linkage system of the invention.

As shown in FIG. 3, energy source switches A, B and C should be closed when linkage locking and listing is needed. When the closing signal of energy source switches A, B and C is received, the control circuit will control the alarm module A, B and C to send A locking reminder to remind the operator to lock and listing.

As shown in FIG. 3, when different or the same operators input their identity information A, B and C through identity identification modules A, B and C, such as fingerprints, the control circuit uploads identity information A, B and C to the cloud platform or performs local authentication on the identity information. Platform from preconfigured authorization information to test the current identity information of A and B and C have locked up for access for operation, local validation according to the authorization of the cloud platform distributed configuration information inspection identity information of A and B, C respectively have locked up for access for operation, and feedback to the cloud platform authentication information, The cloud platform based on its own validation or send instructions get verification of the information feedback, if there has no right to, send validation failure, alarm module maintain locked to remind A, B, C, if have the right to send locked up for instruction, after receiving the control circuit, control their own automatic locking module for energy source switch to lock A, B, C, In addition, alarm modules A, B and C are adjusted to indicate that the current status is locked and listed, so as to warn others that someone is working.

Figure 4:
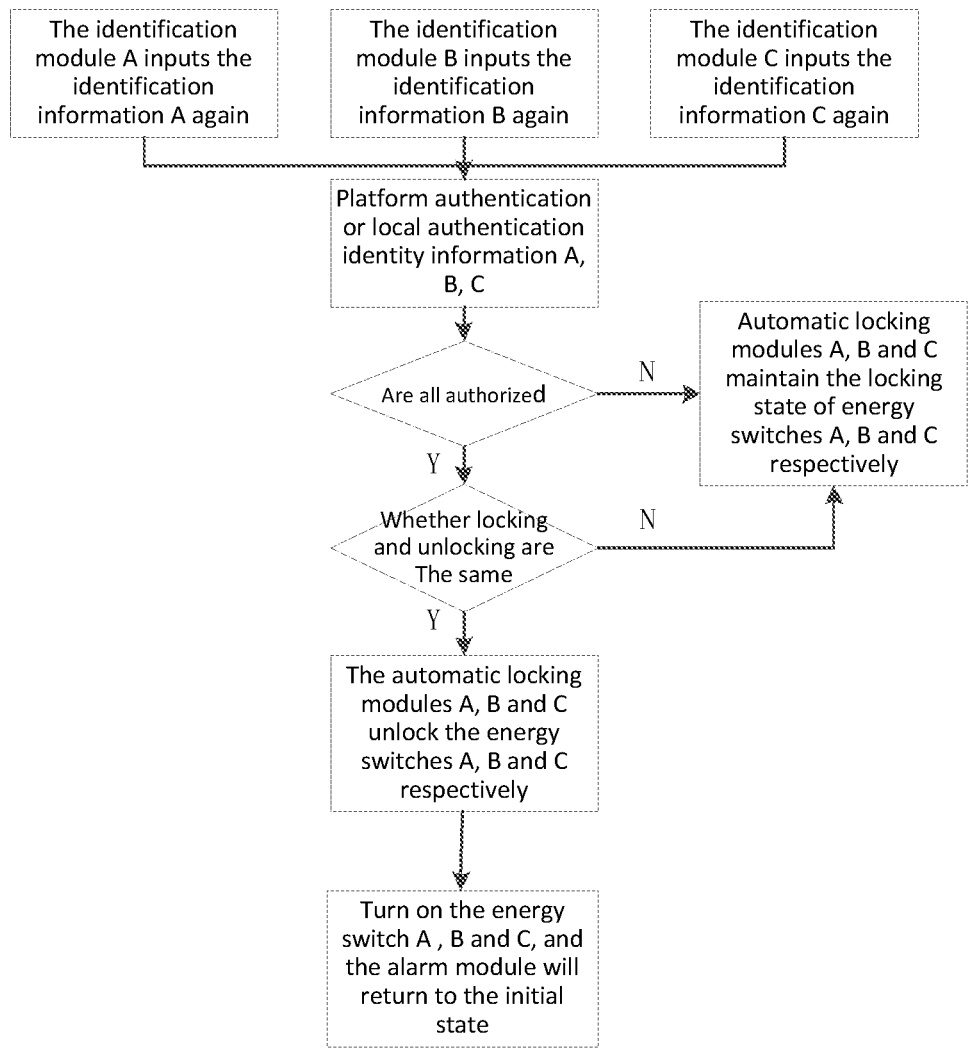
FIG. 4 is the unlocking flow chart of the linkage Smart automatic locking system of the invention.

See FIG. 4, when the operator job completion, you will need to restore equipment state, can again through the identification module A, B, C enter the identity information of A and B, C, control circuit will again identity information A, B, C or upload to the cloud platform for identity information of local validation with A, B, C respectively, optimization, Platform or control circuit not only test the identity information of A and B and C have locked up for access for operation, and test the current identity information whether A, B, C and locked up before the information is the same, if you have permission and information are the same, then the cloud platform sends the unlock instructions, otherwise the validation failure instruction, control circuit to receive the unlock instructions, Control the automatic locking module again to unlock the energy source switch A, B and C, and then open the energy source switch A, B and C. In this way, it can avoid others to unlock the energy source switch A, B and C when different operators have permissions, which can fully ensure the safety of operators and greatly improve the security of the system.

Optimally, in one implementation of this example, the cloud platform communicates with multiple Smart LOTOs in a networking mode, which is used for linkage locking and listing among multiple Smart LOTOs, which are interrelated but not independent, i.e. linkage locking and unlocking, namely the above linkage locking and listing process. In addition, in another implementation of this example, the cloud platform communicates with multiple Smart automatic lock and listing Smart LOTOs separately, which are respectively used for the single lock and listing of each Smart automatic lock and listing Smart LOTO without affecting each other.

This example is introduced in combination with the single-machine locking and listing process of the system.

Figure 8:
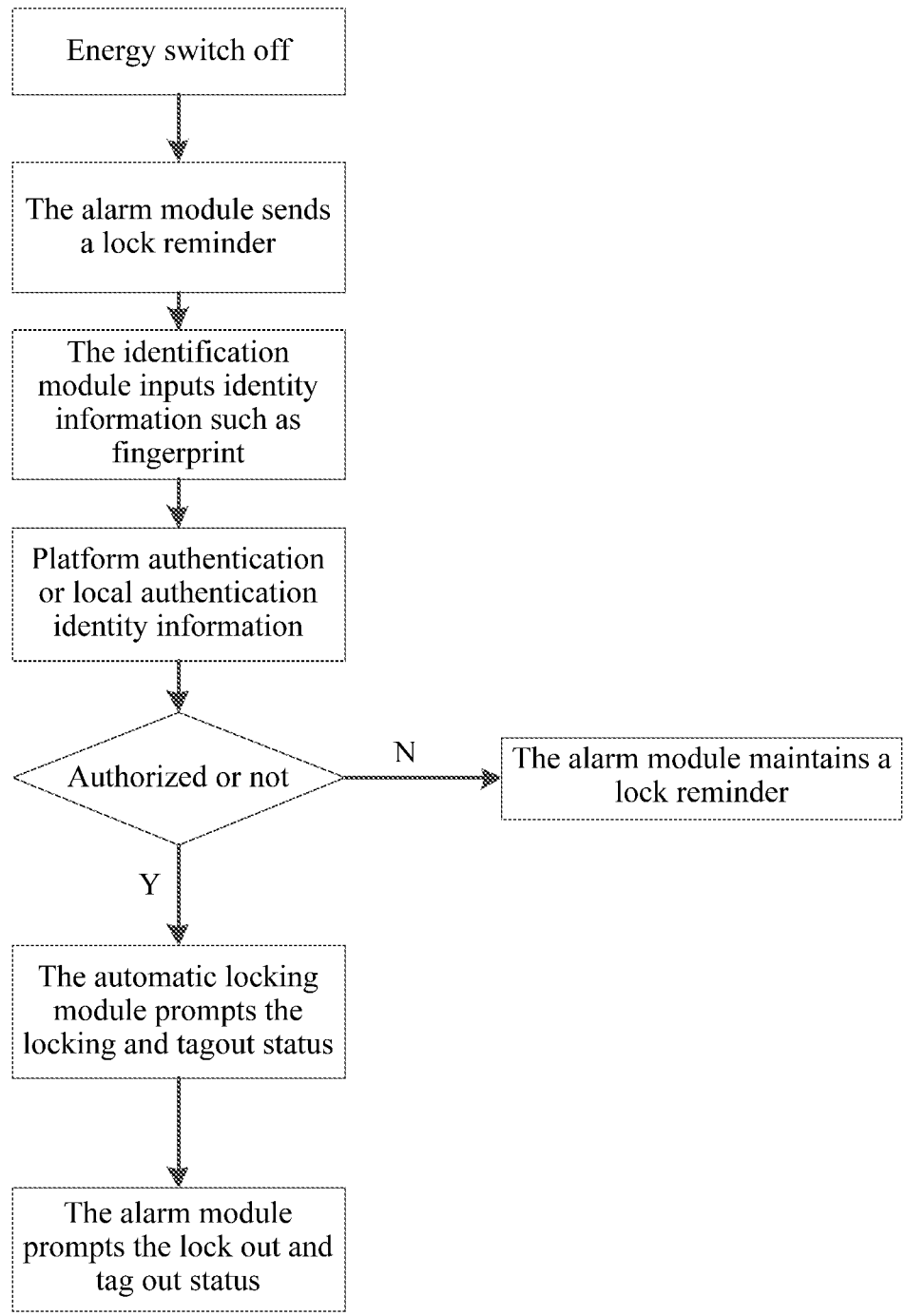
FIG. 8 is the single-machine lock listing flow chart of the Smart LOTO of the invention.

As shown in FIG. 8, when the energy source switch needs to be locked and listed, the control circuit will control the alarm module to send a locking reminder to remind the operator to lock and listed when receiving the closing signal of the energy source switch.

See FIG. 8, when the operator by its identity identification module input information, such as fingerprints, control circuit will identity information uploaded to the external platform or to local identity authentication, among them, the platform from preconfigured authorization information check whether the current identity information has locked up for access for operation, Local control circuit verification, according to the authorization of the external platform distributed configuration information check whether identity information has locked up for access for operation, and feedback to the cloud platform authentication information, if there has no right to, the platform to send or control circuit directly generate validation failure instruction, maintain locked reminded alarm module, if have the right to, the platform directly send or control circuit generates locked up for instructions, After the control circuit receives it, the automatic locking module will lock the energy source switch and adjust the alarm module to remind others that the current state is locked and listed, which has warned others that someone is working.

When the operator job completion, you will need to restore equipment state, can again by its identity identification module input information, control circuit will again identity information uploaded to the external platform or local identity information verification, optimization, platform or control circuit not only check whether the current identity information has locked up for access for operation, And see if the current identity information and the locked up before the information is the same, if you have any retains the same information, the platform to send or control circuit directly to generate the unlock instructions, otherwise the validation failure instruction, control circuit to receive the unlock instructions, control automatically locked module again to unlock energy source switch, then open the power switch, so, This ensures the security of all operators and improves system security.

In this example combines Smart LOTO and cloud platform, the cloud platform not only can be unified to multiple Smart LOTOs verified identity information and locked up for process monitoring, implement each Smart LOTO locked up alone, and multiple Smart LOTOs can be through the same external platform, can achieve any networking between Smart LOTOs, so as to realize multiple lock up Smart LOTO Smart LOTO locked up, The linkage lock, unlock, meet the demand of locked up for any Smart LOTO groups, greatly improving the Smart LOTO, the application scope of Smart LOTO locked up for the safety of more stable, there will not be a Smart LOTO to unlock individually and dangerous, greatly improve the safety of operating personnel, in addition, the cloud platform can also be locked up for authorized personnel management, establishment and management of work order, It is more convenient for the supervision of enterprises, and for the operators, it avoids the dangerous behavior of not locking the listing due to the inertia of operators, and it is more convenient, efficient and safe to use.

Optimally, the cloud platform is also used for personnel authorization management of locking and listing, and work order establishment and management of locking and listing operation. Including authorization management, staff can add or delete people locked up for permissions, unlock the permissions, locked up for establishment and management of the work order operation can control the cloud platform need to be locked up for the Smart LOTO, can realize the correlation between multiple Smart LOTOs, locked up for Smart LOTO operation.

Optimally, this embodiment also includes a Smart LOTO terminal for accessing the cloud platform for real-time monitoring of information in the process of locking and listing. The cloud platform can receive the information uploaded by the Smart LOTO and store it for management. Specifically, in order to facilitate monitoring, it can be processed in the form of charts, analyze personnel, lock and listing time, downtime, and provide big data management analysis. Smart LOTO terminals, such as mobile phones, tablets and PCS, can access the cloud platform to monitor the whole process of lock and listing, and check the information of each lock and listing operation in the history and now. The implementation of the case through the cloud platform and terminal equipment, can be achieved from the Smart LOTO end, to the management platform, to operating personnel at all levels, and monitor the sharing make comprehensive personnel real-time effectively understand equipment locked up for the situation, not only can avoid some remote control equipment personnel to violate compasses operation of equipment, Can also be in the operator distance from the energy source switch has a certain distance, effective, convenient and timely view the lock listing situation, in order to improve the safety of equipment operation.

The embodiments of the invention are described in detail above in combination with the attached drawings, but the invention is not limited to the embodiments mentioned above. Any changes made to the invention, provided they fall within the scope of the claims of the invention and its equivalent technology, will still fall within the scope of protection of the invention.

What is claimed is:

1. A Smart LOTO method is characterized in that it is applied to a system, wherein the system includes a cloud platform and several Smart LOTOs, the method includes the following steps:
    S1: A multiple Smart LOTOs respond to the closing signal of their respective energy source switches and issue locking reminders respectively;
    S2: each Smart LOTO collects identity information respectively and uploads it to a cloud platform for verification or performs local verification on the identity information;
    the verification uploaded to the cloud platform further includes: described in the cloud platform linkage information receiving and grouped according to the preset locked up for validation described various identity information and verify the same group were described by the corresponding to the group after each Smart LOTO automatically locked up for sending locked up for instructions, among them, locked up for linkage information including the network relationship between the Smart LOTO;
    the local authentication of the identity information further includes: the Smart LOTO automatically locked up for local verification mentioned in their acquisition of identity information, and the cloud platform authentication information feedback, the cloud platform based on the above stated locked up for linkage information mentioned in the validation group, authentication information described in the same group were described by the corresponding to the group after each Smart LOTO automatically locked up for sending described locked up for instruction;
    S3: each Smart LOTO receives the locking and listing instruction, automatically locks the respective energy source switch, and prompts the locking and listing status.

2. The Smart LOTO method according to claim 1, wherein in step S2,
    the cloud platform verifies whether the identity information has the operation authority corresponding to the Smart LOTO by querying the right management information of the cloud platform, if it has the operation authority, the lock verification passes; otherwise, the lock verification fails;
    the Smart LOTO verifies whether the identity information has the operation authority corresponding to the Smart LOTO through the authorization management information configured on the cloud platform, if there is operation authority, the locking verification passes; otherwise, the locking verification fails.

3. The Smart LOTO method according to claim 1, wherein in step S2, the identity information is fingerprint information or facial information.

4. The Smart LOTO method according to claim 3, wherein after the step S3, it also includes:
    S4: each Smart LOTO collects the identity information and uploads the identity information to the cloud platform for re-verification or local verification;
    the re-verification uploaded to the cloud platform further includes: the cloud platform receives the identity information again and verifies each identity information in groups according to the locking and listing linkage information, and sends unlock instructions to each Smart LOTO corresponding to the same group after passing the authentication;
    the local re-authentication of the identity information further includes: the Smart LOTO automatically locked up for local authentication mentioned in their acquisition of identity information, and the cloud platform authentication information of feedback, the cloud platform based on the above stated locked up for linkage information mentioned in the validation group, authentication information described in the same group were described by the corresponding to the group after each Smart LOTO sends the unlock instructions stated;
    S5: each smart automatic locking mechanism on Smart LOTO receives the unlock instruction, automatically unlocks the respective energy source switch, and prompts the unlock status.

5. The Smart LOTO method according to claim 4, wherein in step S4,
    described the cloud platform by querying the authorization management information validation described identity information is described with corresponding Smart automatically locked up for Smart LOTO operation privileges, and verify the same described for Smart LOTOs described lock and unlock the identity information is consistent, if operation permissions of lock to unlock found inconsistent, authentication information becomes failed;
    the Smart LOTO delivers the configured authorization management information through the cloud platform to verify whether the identity information has the operation authority corresponding to the Smart LOTO, and verify whether the identity information locked and unlocked by the same Smart LOTO is consistent, if there is operation permission and the unlock information is consistent, the authentication information becomes failed.

6. The Smart LOTO method according to claim 2, wherein after the step S3, it also includes:
    S4: each Smart LOTO collects the identity information and uploads the identity information to the cloud platform for re-verification or local verification;
    the re-verification uploaded to the cloud platform further includes: the cloud platform receives the identity information again and verifies each identity information in groups according to the locking and listing linkage information, and sends unlock instructions to each Smart LOTO corresponding to the same group after passing the authentication;
    the local re-authentication of the identity information further includes: the Smart LOTO automatically locked up for local authentication mentioned in their acquisition of identity information, and the cloud platform authentication information of feedback, the cloud platform based on the above stated locked up for linkage information mentioned in the validation group, authentication information described in the same group were described by the corresponding to the group after each Smart LOTO sends the unlock instructions stated;

S5: each smart automatic locking mechanism on Smart LOTO receives the unlock instruction, automatically unlocks the respective energy source switch, and prompts the unlock status.

7. The Smart LOTO method according to claim 6, wherein in step S4, described the cloud platform by querying the authorization management information validation described identity information is described with corresponding Smart automatically locked up for Smart LOTO operation privileges, and verify the same described for Smart LOTOs described lock and unlock the identity information is consistent, if operation permissions of lock to unlock found inconsistent, authentication information becomes failed;

the Smart LOTO delivers the configured authorization management information through the cloud platform to verify whether the identity information has the operation authority corresponding to the Smart LOTO, and verify whether the identity information locked and unlocked by the same Smart LOTO is consistent, if there is operation permission and the unlock information is consistent, the authentication information becomes failed.

8. The Smart LOTO method according to claim 1, wherein after the step S3, it also includes:

S4: each Smart LOTO collects the identity information and uploads the identity information to the cloud platform for re-verification or local verification;

the re-verification uploaded to the cloud platform further includes: the cloud platform receives the identity information again and verifies each identity information in groups according to the locking and listing linkage information, and sends unlock instructions to each Smart LOTO corresponding to the same group after passing the authentication;

the local re-authentication of the identity information further includes: the Smart LOTO automatically locked up for local authentication mentioned in their acquisition of identity information, and the cloud platform authentication information of feedback, the cloud platform based on the above stated locked up for linkage information mentioned in the validation group, authentication information described in the same group were described by the corresponding to the group after each Smart LOTO sends the unlock instructions stated;

S5: each smart automatic locking mechanism on Smart LOTO receives the unlock instruction, automatically unlocks the respective energy source switch, and prompts the unlock status.

9. The Smart LOTO method according to claim 8, wherein in step S4, described the cloud platform by querying the authorization management information validation described identity information is described with corresponding Smart automatically locked up for Smart LOTO operation privileges, and verify the same described for Smart LOTOs described lock and unlock the identity information is consistent, if operation permissions of lock to unlock found inconsistent, authentication information becomes failed;

the Smart LOTO delivers the configured authorization management information through the cloud platform to verify whether the identity information has the operation authority corresponding to the Smart LOTO, and verify whether the identity information locked and unlocked by the same Smart LOTO is consistent, if there is operation permission and the unlock information is consistent, the authentication information becomes failed.

10. The Smart LOTO method according to claim 3, wherein the Smart LOTO locking and listing method is characterized by the following steps before S1:

S01: send a locking and listing linkage request to the cloud platform, wherein, the locking and listing linkage request includes the identification codes of multiple Smart LOTOs that need locking and listing linkage;

S02: the cloud platform establishes the locking and listing linkage information according to the linkage locking and listing request.

11. The Smart LOTO method according to claim 2, wherein the Smart LOTO locking and listing method is characterized by the following steps before S1:

S01: send a locking and listing linkage request to the cloud platform, wherein, the locking and listing linkage request includes the identification codes of multiple Smart LOTOs that need locking and listing linkage;

S02: the cloud platform establishes the locking and listing linkage information according to the linkage locking and listing request.

12. The Smart LOTO method according to claim 1, wherein the Smart LOTO locking and listing method is characterized by the following steps before S1:

S01: send a locking and listing linkage request to the cloud platform, wherein, the locking and listing linkage request includes the identification codes of multiple Smart LOTOs that need locking and listing linkage;

S02: the cloud platform establishes the locking and listing linkage information according to the linkage locking and listing request.

13. A Smart LOTO system, which comprises with a cloud platform and a number of Smart LOTOs, the cloud platform is provided with a locking verification module:

the Smart LOTO is used to respond to the locking signal of the respective energy source switch, respectively to send a locking reminder, and collect identity information, and upload to the cloud platform or local verification of the identity information, and feedback verification information to the cloud platform;

described locked validation module for linkage information receiving and grouped according to the preset locked up for validation described various identity information and verify the same group were described by the corresponding to the group after each Smart LOTO automatically locked up for sending locked up for instructions, or used to lock up according to the stated linkage information mentioned in the validation group, after passing the verification information of the same group, the lock listing instruction is sent to each Smart LOTO corresponding to the group, wherein, the lock listing linkage information includes the networking relationship between the Smart LOTO;

the Smart LOTO is also used for receiving the locking and listing instruction, automatically locking the respective energy source switch, and prompting the locking and listing status.

14. The Smart LOTO system according to claim 13, wherein the cloud platform also has an unlock verification module:

the Smart LOTO is also used to collect the identity information again, upload it to the cloud platform or authenticate the identity information locally, and feedback the authentication information to the cloud platform;

referred to unlock the validation module for locked up for linkage described according to the information receiving and grouped again to verify each described identity information and verify the same group were described by the corresponding to the group after each Smart LOTO sends the unlock instructions, or locked up for linkage described according to the information mentioned in the validation information packet, after passing the verification information of the same group, the unlocking instruction is sent to the corresponding Smart LOTO of the group;

the Smart LOTO is also used to receive the unlocking instruction, perform automatic unlocking on the respective energy source switch, and prompt the unlocking status.

15. The Smart LOTO system according to claim 14, wherein the unlock verification module is used to verify whether the identity information has the operation authority corresponding to Smart LOTO by querying the authorization management information of the cloud platform, and verify whether the identity information of the lock and unlock of the same Smart LOTO is consistent, if you have the operation authority and the unlock information is consistent, the unlock verification passes; otherwise, the unlock verification fails;

the Smart LOTO used to described by listing on the cloud platform distributed configuration of authorization management information, validation identity information is described with corresponding Smart automatically locked up for Smart LOTO operation privileges, and verify the same described for Smart LOTOs described lock and unlock the identity information is consistent, if you have the operation permission and the unlock information is consistent, the unlock verification succeeds; Otherwise, the unlock verification fails.

16. The Smart LOTO system according to claim 15, wherein the system is characterized in that the cloud platform is also provided with a networking module for receiving the linkage request of locking and listing and establishing the linkage information of locking and listing according to the linkage request of locking and listing, the locking and listing linkage request include the identification codes of multiple Smart LOTOs that require locking and listing linkage.

17. The Smart LOTO system according to claim 14, wherein the system is characterized in that the cloud platform is also provided with a networking module for receiving the linkage request of locking and listing and establishing the linkage information of locking and listing according to the linkage request of locking and listing, the locking and listing linkage request include the identification codes of multiple Smart LOTOs that require locking and listing linkage.

18. The Smart LOTO system according to claim 13, wherein the system is characterized in that the cloud platform is also provided with a networking module for receiving the linkage request of locking and listing and establishing the linkage information of locking and listing according to the linkage request of locking and listing, the locking and listing linkage request include the identification codes of multiple Smart LOTOs that require locking and listing linkage.

* * * * *